United States Patent [19]
Julian

[11] Patent Number: 5,548,856
[45] Date of Patent: Aug. 27, 1996

[54] MOBILE SANITATION STATION

[76] Inventor: Vincent D. Julian, 220 E. Crusader Dr., Murray, Utah 84107

[21] Appl. No.: 426,680

[22] Filed: Apr. 24, 1995

[51] Int. Cl.$^6$ ................................................. A47K 4/00
[52] U.S. Cl. ................................................. 4/664; 4/625
[58] Field of Search ........................... 4/619, 621, 625, 4/626, 630, 664

[56] References Cited

U.S. PATENT DOCUMENTS

| | | |
|---|---|---|
| 1,322,595 | 11/1919 | Meiklejohn . |
| 1,606,234 | 11/1926 | Jordan . |
| 1,680,121 | 8/1928 | Smith ........................................... 4/626 |
| 2,059,818 | 11/1936 | Simon . |
| 2,192,383 | 5/1940 | Krolop ........................................ 4/626 |
| 2,772,420 | 12/1956 | Carter ........................................ 4/458 X |
| 2,817,846 | 12/1957 | Stift ............................................ 4/664 |
| 2,964,204 | 12/1960 | Wilson . |
| 3,092,273 | 6/1963 | Schramm . |
| 3,189,317 | 6/1965 | Nieto, Jr. . |
| 3,891,106 | 6/1975 | Alcanzare . |
| 4,394,105 | 7/1983 | Mitchell . |
| 4,653,125 | 3/1987 | Porter ........................................ 4/664 X |
| 4,711,499 | 12/1987 | Fortin . |
| 4,802,709 | 2/1989 | Jones . |
| 5,039,271 | 8/1991 | Julian ........................................ 414/436 |
| 5,183,293 | 2/1993 | Julian ........................................ 4/449 X |

FOREIGN PATENT DOCUMENTS 0071119 2/1893 Germany ................................. 4/626

Primary Examiner—Charles E. Phillips
Attorney, Agent, or Firm—M. Reid Russell

[57] ABSTRACT

A mobile sanitation that includes at least one conventional self-contained chemical toilet and at least one hand washing system that are mounted together onto a flat bed of a trailer. The self-contained chemical toilet or toilets are arranged to gravity drain through a common line and the hand washing system includes a housing with a sealed bottom end that is secured onto the trailer flat bed to be positioned alongside the chemical toilet or toilets. The hand washing system housing includes a divider plate secured thereacross forming the housing into a fresh water reservoir that is accessed through the housing top end, a hand washing section that is accessed through an opening in the housing, that includes a drain plate secured across the housing as a bottom of the hand washing section, and with a dirty water reservoir as the housing bottom portion. The fresh water reservoir gravity feeds water through a tube that connects to a manually operated valve within the hand washing section that is operated to pass water through a nozzle and onto a person's hands positioned therein, with that water then traveling into the dirty water reservoir wherein it is held for later disposal. A movable door is provided for sliding across the housing opening into the hand washing section that can be locked in a covering attitude.

12 Claims, 2 Drawing Sheets

MOBILE SANITATION STATION

BACKGROUND OF THE INVENTION

1. Field of the Invention

This invention relates to trailer mounted portable toilet systems arranged to be pulled behind a prime mover vehicle, and particularly to self-contained systems that include at least one portable toilet and a hand washing facility.

2. Prior Art

In the mobile society that the citizens of the United States today enjoy it is not usual for people to utilize their leisure time in recreational travel and it is accordingly common for mountain and desert areas to receive an inflow of high concentrations of people on weekends and holidays. Also, the military is required to train and operate in very remote areas where bathroom facilities are not available. Such civilian and military use has a major impact on the environment, with human refuse handling having increasingly become a major problem and environmental hazard. Government authorities, including military commanders, charged with keeping such remote areas clean have attempted to meet this requirement with appropriate placement of portable toilets that themselves have created problems with disposal of collected waste. Such portable toilets often require an employment of pumping vehicles to handle collected waste that are expensive to operate and maintain and also pollute the environment. Further, it is often the case that an anticipated need for permanent toilet facilities will not accurately reflect actual human concentrations in areas of use. Further, even trailer mounted portable toilets as have been available have lacked hand washing facilities as a disease preventative, which facilities are included with the present invention.

The present invention provides a versatile combination of one or more chemical toilets that are individually mounted onto a bed of a light trailer that is easily moved to and from a remote area. Incorporated therewith is at least one hand washing facility that includes a clean water supply, a faucet and a wash area within the facility along with a drain and collection tank integral therewith. The system provides arrangements for convenient gravity draining the chemical toilets and the collection tank into a proper disposal facility.

Applicant is the inventor of two U.S. Pat. Nos. 5,039,271 and 5,183,293 that involve a trailer mounted trash handling apparatus and a combination trailer mounted trash apparatus and chemical toilet carrier. Which earlier patents, however, do not include the hand washing system that is part of the present invention.

Where dumping trailer configurations and even dumping trash bin arrangements are not new, and examples of such are shown in U.S. Pat. Nos. 1,606,234; 3,092,273; 3,891,106; 4,394,105; 4,711,499; and 4,802,709. None of these systems, however, involve a trailer mounted chemical toilet and self-contained hand washing system like that of the present invention.

SUMMARY OF THE INVENTION

It is therefore a principal object of the present invention in a mobile sanitation system to provide a trailer mounted combination of at least one self-contained chemical toilet and at least one self-contained hand washing system.

Another object of the present invention is to provide a combination of at least one self-contained chemical toilet and hand washing system that are mounted on a trailer flat bed that includes at least one step up to a platform adjacent to and to provide access to the of chemical toilet and hand washing system.

Another object of the present invention is to provide, with at least one and preferably a plurality of self-contained chemical toilets, a free standing self-contained hand washing system that is mounted on the trailer flat bed and includes a clean water reservoir, with an arrangement for filling same, a valve operated faucet, and a drain arrangement leading to a used water catchment tank that is arranged for convenient gravity draining as is the trailer mounted self-contained chemical toilet.

Still another object of the present invention is to provide, in conjunction with the hand washing system, a door arrangement for closing off access to the system faucet for use during trailer movement.

Still another object of the present invention is to provide a mobile sanitation station for use in a wilderness area to handle both human waste management needs and for individual hand washing for disease prevention.

The present invention is in a combination of at least one and preferably a plurality of self-contained chemical toilets and at least one hand washing system that are individually mounted onto a trailer for convenient movement to a remote area. The trailer may be a single axle flat bed trailer, but is preferably a tandem axle trailer, whereon a pair of self-contained chemical toilets are mounted. Further, a stair arrangement is preferably provided for providing access from the ground onto the flat bed to provide access to a door of each of the chemical toilets.

The trailer includes a tongue that extends from its front end and whereon is mounted a conventional hitch that is for securing the trailer to a towing vehicle. One and preferably at least a pair of conventional self-contained chemical toilets are individually mounted onto the trailer flat bed such that a portion of that flat bed will provide access to a door of each self-contained chemical toilet. The stair arrangement that is included with the trailer may be rigid or may be pivotally mounted thereto, and the flat bed may include a guard rail that is adjacent to which stair case and extends around the trailer bed edge containing the bed area in front of the chemical toilet doors.

The self-contained chemical toilets are arranged side-by-side across the trailer bed, with their doors either facing towards the tongue or towards the trailer rear end to open onto the portion of the trailer bed that is across the trailer nose or front portion and whereto the stair or stairs arrangement affords access. The stair arrangement, when mounted so as to be pivoted, is arranged to be foldable onto the trailer bed for travel. Brackets are provided to mount the chemical toilets onto the trailer bed and spaced apart landing gears are arranged at intervals around the trailer bed, that are secured to the tailer frame. In use, the landing gears are lowered into ground engagement for supporting the trailer nose to allow removal of a towing vehicle.

A hand washing system of the invention is provided for each individual or pair of self-contained chemical toilets that is mounted to extend vertically from the trailer bed, alongside and preferably along the junction of a pair of self-contained chemical toilets. The hand washing system is arranged within a single housing and includes a reservoir across a top portion thereof that is filled with clean water to gravity feed the water through a nozzle that is maintained in a hand washing section. Which water flow is provided on operation of a manual valve that passes water out of a nozzle end that is located in that washing section. The water is provided for use in washing a person's hands, with the dirty water flowing through a drain into a catchment reservoir that is arranged in a bottom portion of the housing to be held for disposal. The system includes an access opening for a person to put their hands through into the hand washing section, to position their hands below the nozzle and operate the valve, which opening is coverable by a sliding door when not in use. External lines connect to the chemical toilets and dirty water reservoirs for gravity draining through valves into a disposal tank or tanks.

Other objects and features of the invention will become apparent from the following detailed description and drawings disclosing what is presently contemplated as being the best mode of the invention.

THE DRAWINGS

DETAILED DESCRIPTION

Figure 1:
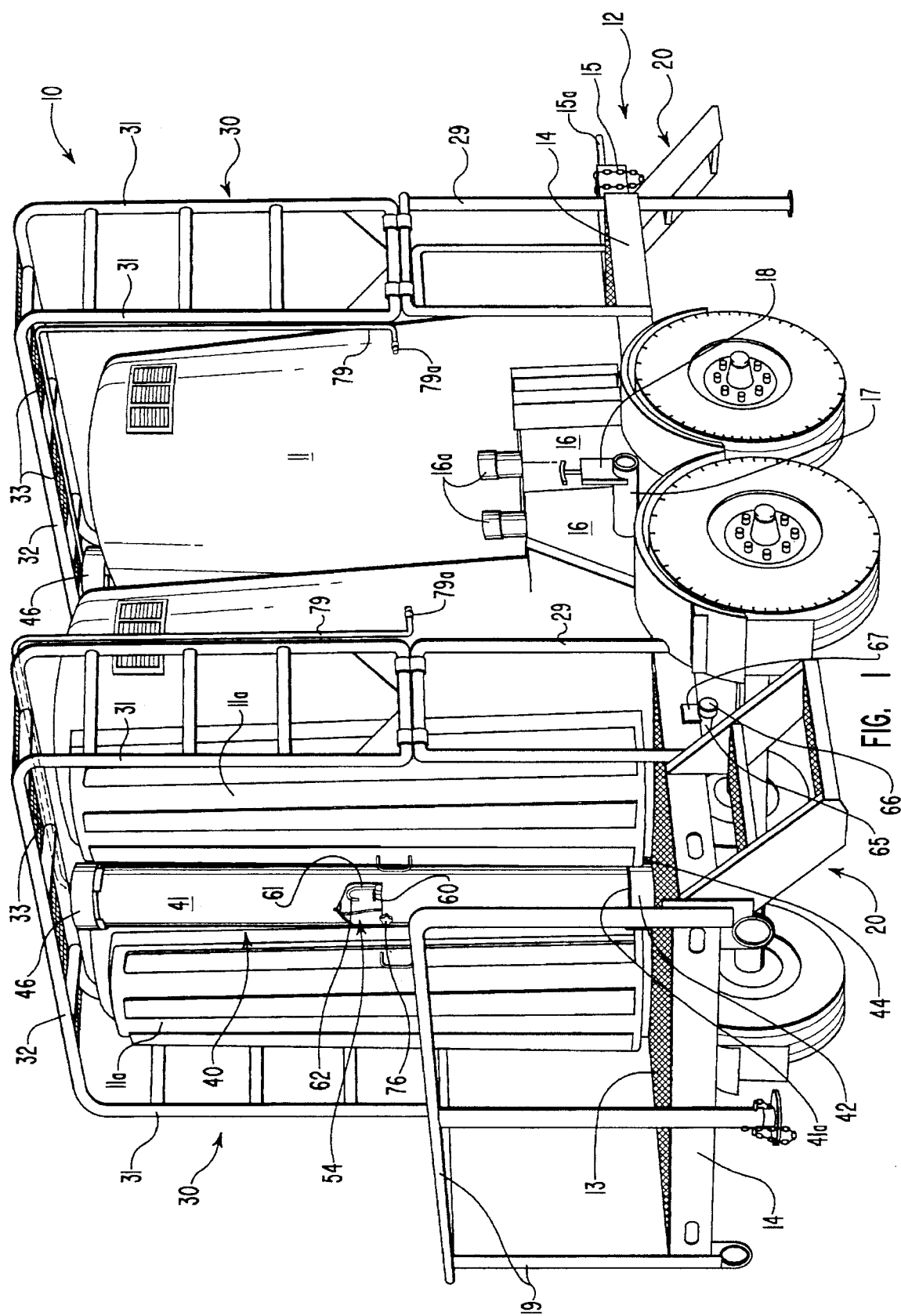
FIG. 1 is a side elevation perspective view of the mobile sanitation system of the present invention showing two pairs of chemical toilets mounted onto a flat bed of a tandem trailer and showing a hand washing system of the invention maintained between a rear pair of which chemical toilets.

In FIG. 1 a mobile sanitation system 10 of the invention is shown as including two pairs of chemical toilets 11 that are positioned back-to-back on a flat bed 13 of a tandem trailer 12, hereinafter referred to as trailer. The trailer 12 includes a frame 14 whereon and wherebetween the flat bed 13 is secured, that is preferably formed from channel sections to have a rectangular shape with a tongue 15 extending from a forward end whereon is mounted a hitch 15a that is for coupling to a towing vehicle.

As shown in FIG. 1, the pairs of chemical toilets 11 are arranged back-to-back, and are centered across the middle section of the trailer bed 13 such that holding tanks 16 of each pair will butt against one another. The holding tanks 16 are preferably open to one another such that both can be gravity drained through a single exhaust line 17 on operation of a valve 18, shown herein as a gate valve. Which gravity draining is facilitated by the inclusion of vent lines 16a into each holding tank to provide for pressure equalization during draining. Upright guard rails 19 are shown provided across the trailer bed ends that are bent through approximately ninety degrees (90°) back to a vertical side of one of the chemical toilets 11. A stair or step 20 extends from a corner of the frame 14 to engage or extend to just above the ground. Which stair or step is shown as being fixed to the frame 14 but, it should be understood, may be pivotal mounted to allow for its being rotated upwardly for transport and then rotated back to the attitude shown for use, within the scope of this disclosure.

Adjacent to the stair or step 20, and along the opposite trailer side of which step, is shown a rectangular section of a lower ladder frame section 29 that extends at essentially a right angle upwardly from the frame 14. The ladder frame, in turn, is shown secured at a lower end of one or two parallel ladder frame parallel sides 31 wherebetween rungs are secured, and showing a flat ladder frame top portion 32 that extends between top ends of the parallel sides 31. The ladder frame flat top portion 32 preferably includes a mesh tread section 33 secured between rungs of the ladder frame top portion 32 for supporting a person's weight thereon and to provide that person with access to the tops of the pairs of self-contained chemical toilets 11 and to a top portion of a fresh water reservoir 49 section of a long cylindrical housing 41 of a hand washing system 40 of the invention, as shown in FIG. 2 and set out and discussed hereinbelow.

Figure 2:
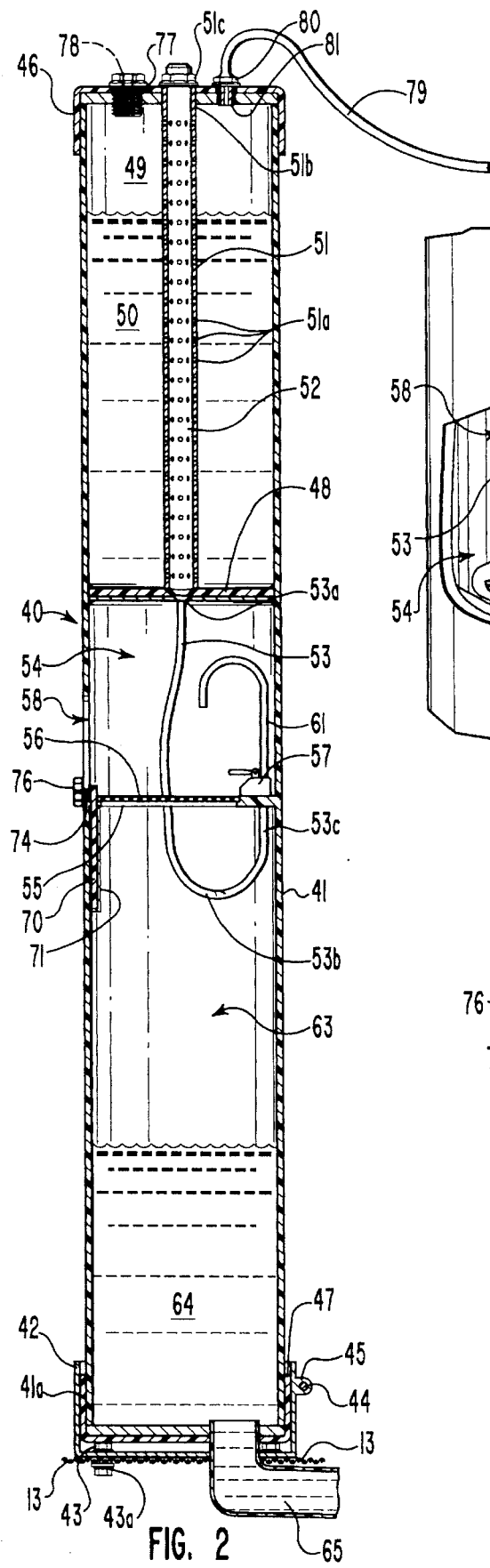
FIG. 2 is a vertical sectional view of the hand washing system of FIG. 1 removed from its mounting on the trailer flat bed.

The hand washing system 40, shown in FIGS. 1 and 2, is preferably contained in the long cylindrical body 41, a body lower end 41a of which is arranged for fitting in sealing engagement into bottom cap 47 that is, in turn, fitted in a collar 42 mounted onto the flat bed 13, as shown in FIG. 1. The collar 42, shown in FIG. 1, is preferably secured to the flat bed 13 as with bolts 43 fitted therethrough whereon nuts 43a are turned. The collar 42 preferably includes a compression bolt 44 fitted through a pair of opposing wings 45, to move, when the compression bolt 44 is turned, the wings 45 towards one another, tightening the collar 42 onto the end 41a of the cylindrical body 41. The cylindrical body 41 is thereby maintained onto the flat bed 13 at the junction of each pair of self-contained chemical toilets 11, and alongside the toilet doors 11a. Accordingly, the hand washing system 40 is conveniently located to a person exiting out of the self-contained chemical toilets.

FIG. 1 shows a use of two pairs of self-contained chemical toilets 11 maintained on a single tandem axle trailer 12, with each pair including a single hand washing system 40 maintained therebetween. It should, however, be understood that a single pair of self-contained chemical toilets 11 along with a single hand washing system 40 could be so used with the assemblies maintained on a single axle trailer, within the scope of this disclosure. Further, it should be understood, that the invention, like my earlier patent particularly U.S. Pat. No. 5,183,293, could involve an inclusion of a trash collecting bin with the pair of self-contained chemical toilets 11 and including a hand washing system 40, within the scope of this disclosure.

Figure 3:
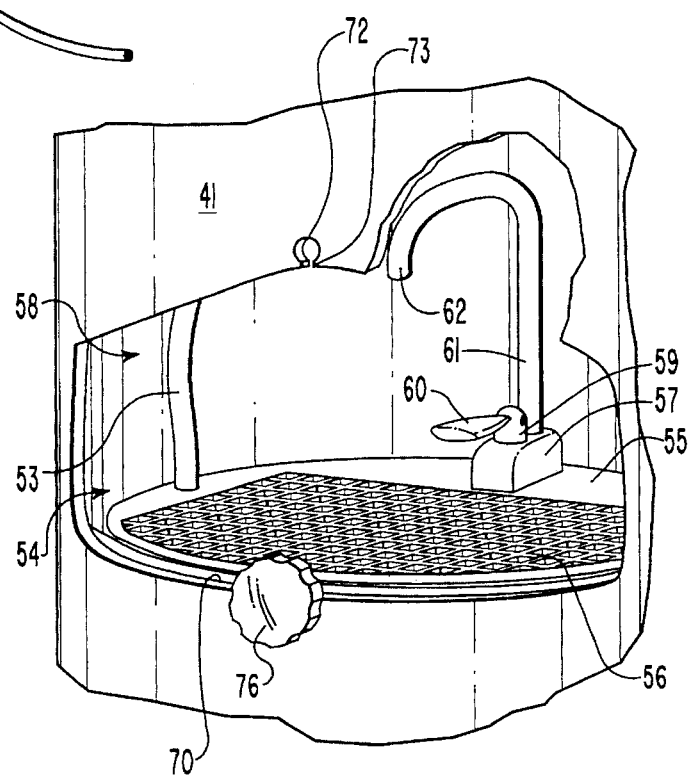
FIG. 3 is an enlarged frontal perspective view of a hand washing portion of the hand washing system of FIG. 1 shown broken away therefrom.

The hand washing system 40, as shown best in FIG. 2, preferably provides for capping off the cylindrical housing 41 at its ends by top and bottom caps 46 and 47, respectively, with the bottom cap to seal the cylinder bottom end 41a against leakage of water stored therein. The cylinder contains a flat bulk head 48 secured thereacross in sealing arrangement for dividing the cylinder into a fresh water reservoir 49 thereabove, and with a hand washing section 54 therebelow. The fresh water reservoir 49 is shown as containing a volume of water 50. An upright stand pipe 51 that is open therethrough and includes a number of speed holes 51 formed therethrough and is mounted at a lower end into the center of the bulk head 48 to extend therefrom with a top end 51b fitted through a vent nut 51c fitted through the cap and is open therethrough as a vent. Optionally, a filter screen 52 can be fitted around along the length or a portion of the length of the stand pipe 51 wherethrough the water 50 passes. The stand pipe 51 lower end is connected to an end of a water line 53. With the water line 53, as shown in FIGS. 2 and 3, connected to the stand pipe end at 53a and will extend across hand washing section 54 that is located in a midsection of the cylinder housing 41, on one side thereof. Which water line is shown bent at 53b back upon itself and connects at a lower end 53c through a mesh 56 covered divider plate 55 into a valve head 57. The valve head 57 is shown mounted onto a top surface of the divider wall 55, proximate to a rear end thereof relative to an opening 58 formed through the side of cylinder 41, and above the divider wall 55 to extend into the hand washing section 54.

The valve head 57 includes a valve therein that is controlled by lifting or lowering a rod 59 journaled into the valve head that is operated by manually raising or lowering an arm 60 that extends from the valve head, as shown in FIG. 2 and best in FIG. 3. A pipe that is arranged as a faucet 61 extends upwardly from the valve head top surface and includes a U-shaped bend therein with a nozzle end that is directed downwardly towards the divider plate 55. So arranged, when the valve is operated by raising or lowering the arm 60, water 50 from the fresh water reservoir 49 will be gravity fed from the stand pipe 51, through the water line 53. That water 50 will pass through the valve and pipe faucet 61 and out of a faucet nozzle end 62 onto a person's hands that are maintained in the hand washing section 54 below that nozzle end.

In use, a person passes their hands through the cylinder opening 58 and into the hand washing section 54 wherein, by raising or lowering the arm 60, clean water 50 is dispensed through the nozzle end 62. The arm 60 is preferably spring based such that when it is released the valve will return to a closed attitude, shutting off the clean water flow. The dispensed clean water 50, after used to wash the person's hands, flows through the mesh 56 and into a dirty water container 63, wherein the dirty water 64 is maintained. A drain line 65 connects through the bottom cap 47 and terminates in a drain connector end 66, shown in FIG. 1. A valve 67, shown as a gate valve, is arranged in the drain line 65 outer end that is for controlling discharge of the dirty water 64.

Figure 4:
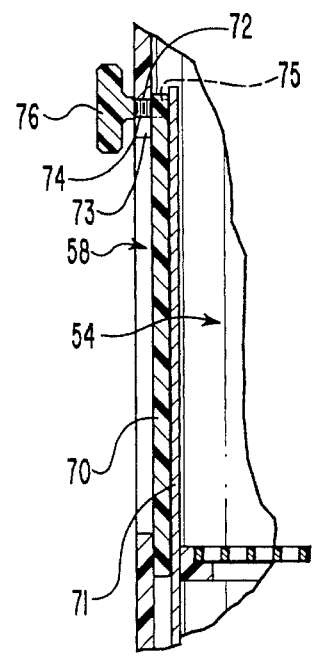
FIG. 4 is a side elevation view of the front section of the hand washing portion of FIG. 3 showing a sliding door as having been slid over an opening into the system housing and is shown secured thereover by turning of a screw type clamp.

To provide for covering the hand washing section 54 during travel and when the system is not in use, a door 70, as shown in FIGS. 3 and 4, is maintained to slide vertically up and down in tracks 71 across the opening 58. With the door 70 moved over the opening 58, a receiving lock hole 72, that is formed into the cylinder side above the opening 58, receives a bolt 74 that is journaled in the door 70 top end that has traveled along a straight vertical slot 73 from the opening 58 top edge into the receiving lock hole 72. Which bolt 74 is turned into a threaded hole 75, shown in broken lines, in the door 70 by manually turning a bolt broad head end 76. The bolt broad head end 76 undersurface clamps the receiving lock hole 72 edge between it and the door 70. The door 70 is thereby locker, in covering arrangement, over the hand washing section 54 and across opening 58. Which clamping action is released by oppositely turning the bolt broad head 76, unclamping the edge of the receiving lock bolt 72, so as to allow the door 70 to be slid down from the attitude shown in FIG. 4 to the attitude shown in FIG. 3.

When filling the fresh water reservoir 49 and discharging water therefrom it is necessary to provide a vent to atmosphere to avoid a pressure buildup or vacuum. This venting is provided by the vent nut 51c and can also include an air release valve 77, shown in FIG. 2, that has a passage 78 therethrough, shown in broken lines, and provides for both venting air during reservoir filling and releases water therefrom as an overflow regulator. To provide for filling the fresh water reservoir 49 with fresh water 50, a fill pipe 79 is connected through a fitting 80 turned into a port 81 in the top cap 46. Which fill pipe 79, shown in FIG. 1, connects to the ladder frame 30 and includes a hose coupling 79a on the end thereof for connection to a water line or hose to pass water into the fresh water reservoir 49. In which filling through the fill pipe 79, an operator can determine when the fresh water reservoir 49 is filled when water begins to flow out of the air release valve 77. Alternatively, an operator can remove the top cap 46 and pour fresh water directly into the fresh water reservoir 49, as needed.

Although a preferred form of my invention in a mobile sanitation system has been shown and described herein, it should be understood that the present disclosure is made by way of example only and that variations are possible without departing from the subject matter coming within the scope of the following claims and a reasonable equivalency thereof, which subject matter I regard as my invention.

I claim:

1. A mobile sanitation system comprising, a trailer having a frame covered by a flat bed and including means for connection to a towing vehicle; at least one self-contained chemical toilet mounted on said trailer flat bed; a hand washing system that includes a housing that is a straight cylinder mounted at a lower end onto said trailer flat bed and includes an opening formed into mid-portion of said cylinder interior to receive a person's hands passed therein into said cylinder interior, with an upper portion of said cylinder formed as a fresh water reservoir to gravity feed clean water through a hose to a manually operated valve located within said cylinder mid-portion that is operated to dispense said clean water through a nozzle, and said cylinder mid-portion includes a washing section base plate secured across as a top of a cylinder closed bottom section and wherein a dirty water drain is formed; and a door for fitting over the opening into the cylinder mid-portion that is a rectangular plate formed to the shape of the straight tube outer surface and has opposing parallel sides that are formed to fit into so as to slide along a pair of straight tracks that are secured along opposite vertical sides of said opening and extend below said washing section base plate.

2. A mobile sanitation system as recited in claim 1, wherein the cylinder extends vertically alongside the self-contained chemical toilet and includes a flat divider plate that is mounted across a top of the cylinder mid-portion separating the fresh water reservoir from said cylinder mid-portion, with access to said fresh water reservoir provided through a cylinder top end plate; and the washing section base plate extends across said cylinder adjacent to and as a bottom of said hand washing section having the dirty water drain centered therein and with a flat section of a mesh material positioned over said dirty water drain.

3. A mobile sanitation system as recited in claim 2, wherein the flat divider plate includes a standpipe with holes therein to pass water into said standpipe and is mounted at approximately a right angle vertically from said plate and passes through the cylinder top portion and top end as an air release means and connects to a top end of the hose, with said hose having a bottom end connected to the manually operated valve that is secured onto the flat divider plate and includes a nozzle end and an arm that is pivotally mounted thereto that is manually depressed to open said valve to pass water through said nozzle end.

4. A mobile sanitation system as recited in claim 3, where the nozzle end is a tube secured to and extending from the valve and is positioned to dispense the fresh water within the cylinder mid-portion.

5. A mobile sanitation system as recited in claim 4, wherein the nozzle end is curved back upon itself; and a drain line is mounted at one end into the cylinder bottom section and outwardly extends from the cylinder outer surface to approximately the trailer frame; and a discharge valve that is maintained in said drain line for operation to gravity drain collected dirty water.

6. A mobile sanitation system as recited in claim 1, wherein at least a pair of portable chemical toilets are mounted onto the trailer bed, in side-by-side relationship, with the hand washing system mounted between said pair of portable chemical toilets and adjacent to doors of said portable chemical toilets.

7. A mobile sanitation station comprising, a trailer having a frame covered by a flat bed and including means for connection to a towing vehicle; at least one self-contained chemical toilet mounted on said trailer flat bed; a hand washing system that includes a housing that is a straight cylinder that is mounted at a lower end onto said trailer flat bed and includes an opening formed into a mid-portion of said cylinder interior to receive a person's hands passed therein into said cylinder interior, with an upper portion of said cylinder formed as a fresh water reservoir to gravity feed clean water through a connected hose to a manually operated valve located within said cylinder mid-portion that is operated to dispense clean water through a nozzle, and said cylinder mid-portion includes a washing section base plate as a top of a cylinder closed bottom section wherein a dirty water drain is formed; and a ladder frame secured at its ends to the flat bed and is bent through two right angles to extend alongside and across the self-contained chemical toilet and the hand washing system.

8. A mobile sanitation system as recited in claim 7, wherein the cylinder extends vertically alongside the self-contained chemical toilet and includes a flat divider plate that is mounted across a top of the cylinder mid-portion separating the fresh water reservoir from said cylinder mid-portion, with access to said fresh water reservoir provided through a cylinder top end plate; and the washing section base plate extends across said cylinder adjacent to and as a bottom of said hand washing section having the dirty water drain centered therein and including a flat section of a mesh material positioned over said dirty water drain.

9. A mobile sanitation system as recited in claim 8; wherein the flat divider plate includes a standpipe with holes therein to pass water into said standpipe and is mounted at approximately a right angle vertically and passes through the cylinder top portion and top end as an air release means and connects to a top end of the hose, with said hose having a bottom end connected to the manually operated valve that is secured onto the flat divider plate and includes a nozzle end and an arm that is pivotally mounted thereto that is manually depressed to open said valve to pass water through said nozzle end.

10. A mobile sanitation system as recited in claim 9, where the nozzle end is a tube secured to and extending from the valve and is positioned to dispense the fresh water within the cylinder mid-portion.

11. A mobile sanitation system as recited in claim 10, wherein the nozzle end is curved back upon itself; and a drain line is mounted at one end into the cylinder bottom section and extends outwardly from the cylinder outer surface to approximately the trailer frame; and a discharge valve that is maintained in said drain line for operation to gravity drain collected dirty water.

12. A mobile sanitation system as recited in claim 7, wherein at least a pair of portable chemical toilets are mounted onto the trailer bed, in side-by-side relationship, with the hand washing system mounted between said pair of portable chemical toilets and adjacent to doors of said portable chemical toilets.

* * * * *